(No Model.)
T. S. BAYLEY.
Feeder for Thrashing Machines.
No. 239,216.  Patented March 22, 1881.
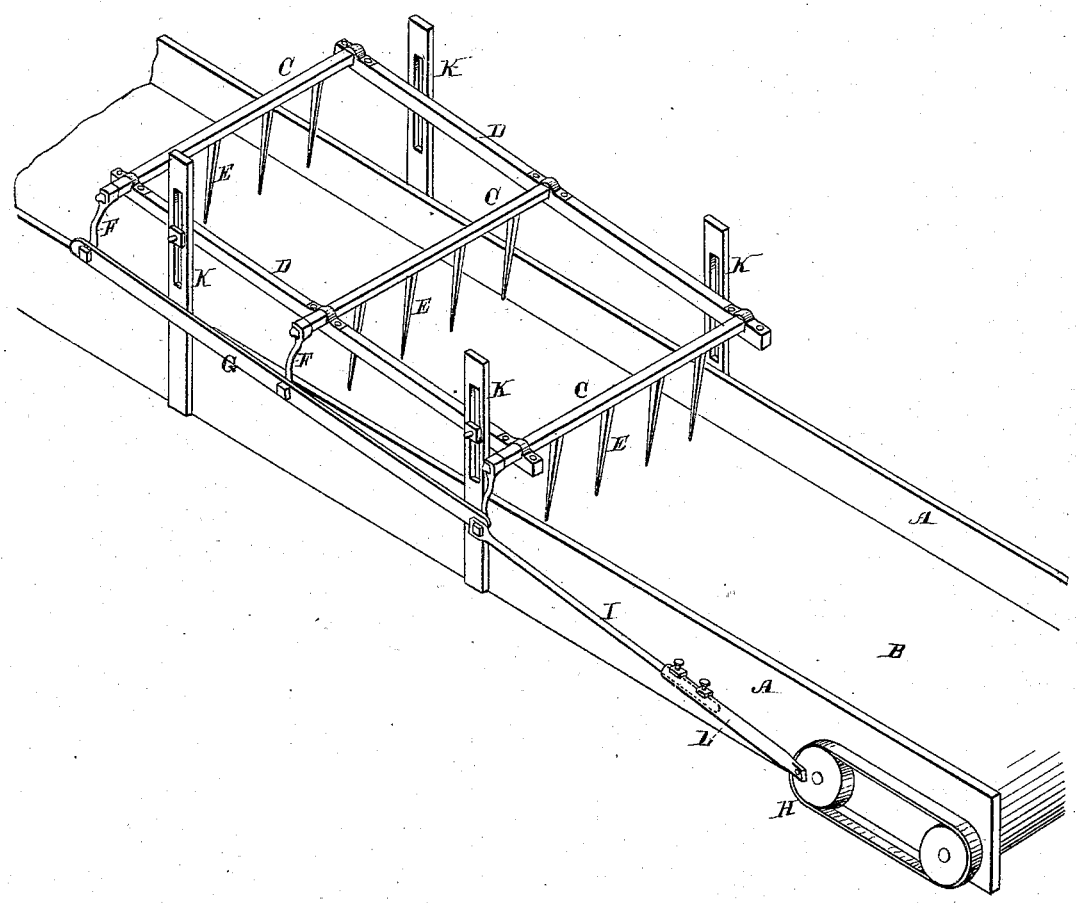
Witnesses  
Geo. H. Strong  
Frank A. Brooks
Inventor  
Thomas S. Bayley  
By Dewey & Co.  
Attys

UNITED STATES PATENT OFFICE.

THOMAS S. BAYLEY, OF ORLAND, ASSIGNOR TO BYRON JACKSON, OF SAN FRANCISCO, CALIFORNIA.

FEEDER FOR THRASHING-MACHINES.

SPECIFICATION forming part of Letters Patent No. 239,216, dated March 22, 1881.

Application filed September 1, 1880. (No model.)

*To all whom it may concern:*

Be it known that I, THOMAS S. BAYLEY, of Orland, county of Colusa, and State of California, have invented an Improved Spreading and Distributing Device for Feeders of Thrashing-Machines; and I hereby declare the following to be a full, clear, and exact description thereof.

My invention relates to certain improvements in devices for spreading or distributing the grain evenly on the elevator or feeder of a thrashing-machine; and it consists in the employment of one or more series of fingers of suitable length mounted upon bars placed upon a frame (made vertically adjustable at either or both ends at will) transversely above the carrying-belt or other device for conveying the grain from the stack to the thrasher, and caused to vibrate or oscillate by means of an adjustable pitman connected to a crank or eccentric. This oscillating motion of the fingers acts upon the straw to hold back and loosen up any bunches and distribute them, so that the straw will be delivered evenly to the feeder, as will be more fully described by reference to the accompanying drawings, in which the figure of the drawing is a view of a feeder embodying my invention.

A is the frame-work of an elevator such as is intended to bring straw from the stack to the feeder of the machine. A belt, B, moves around rollers at each end of the frame, and carries the straw upward and forward in the usual manner after it has been deposited upon the belt by the pitchers or by other means. Above this belt is placed a series of as many transverse rocking finger-bars C as may be desired. These bars have journals at each end, and these journals are formed upon longitudinal side bars, D, so that by altering the position or angle of these side bars all the sets of finger-bars may be raised together, or they may be set at different elevations, depending upon the angle of the bars D. The transverse bars C have fingers E, which are made of any suitable length, and they project downward so as to dip into the straw as it passes beneath them upon the carrying-belt.

In the present case I have shown my device as applied to feeders in which a draper or carrying-belt is employed; but it will be seen that it may be used in this or other carrying devices, such as rollers or pushing-forks.

By raising the ends of the side bars, D, which are nearest the receiving end of the carrying-belt so that they stand at an incline the fingers nearest the cylinder will reach nearer to the belt than those which are the most distant.

The bars C may be made of wood or tubular iron, and the fingers may be of wood or metal. At one end of the vibrating rakes C are formed cranks F, and the whole series may be united by a connecting-rod, G.

The eccentric or crank H may be secured upon the driving-shaft, as shown, or a countershaft, if it is desirable to have a different speed, or for convenience.

The pitman or connecting-rod I may be connected to either of the rakes C by means of a crank and vibrate the whole series of rakes C.

The side bars, D, are elevated or depressed so as to regulate the position of the rake-teeth with reference to the belt by means of bolts and nuts or equivalent devices, which move in slots in the sides of the vertical standards or supports K. In order to accommodate the length of the pitman I to these adjustments, it is formed with a sliding or telescoping section, L, which allows the length to be altered at will without special adjustment.

The operation of my apparatus will then be as follows: The fingers, being oscillated by the action of the bars C and cranks, will alternately press back any bunches of straw which are brought to them by the belt, and then, by swinging forward, they allow the straw to pass without clogging. The bunches, being swept backward, will be distributed over thinner spots and the whole will be equalized. The fingers may be raised so that those farthest from the cylinder or discharge end of the carrier or elevator will be highest, and each succeeding set will be a little lower. This divides the work between them and makes it much easier to distribute the straw.

This device is much superior to rotary pickers, as the teeth of those are liable to wind up the straw and clog; but the oscillating fingers, as they swing back and forward, will distribute the bunches without clogging.

Having thus described my invention, what I claim as new, and desire to secure by Letters Patent, is—

1. The combination, with the carrier A, of vibrating spreaders C E, having teeth fixed in rocking heads, said heads being supported in a frame vertically adjustable at either or both ends at will, substantially as described, and for the purpose set forth.

2. The combination, with the carrier A, provided with the slotted standards K, of the adjustable side bars, D, vibrating spreaders C E, journaled in the side bars, cranks F, connecting-rod G, eccentric H, and adjustable pitman I, substantially as described, and for the purpose set forth.

In witness whereof I have hereunto set my hand.

T. S. BAYLEY.

Witnesses:
 BYRON JACKSON,
 F. C. LUSK.